(12) United States Patent
Dahl

(10) Patent No.: US 8,462,663 B2
(45) Date of Patent: Jun. 11, 2013

(54) LOCATION OF MOBILE NETWORK NODES

(75) Inventor: Paul A. Dahl, Pleasant Grove, UT (US)

(73) Assignee: Digi International Inc., Minnetonka, MN (US)

( * ) Notice: Subject to any disclaimer, the term of this patent is extended or adjusted under 35 U.S.C. 154(b) by 732 days.

(21) Appl. No.: 12/631,157

(22) Filed: Dec. 4, 2009

(65) Prior Publication Data

US 2011/0138035 A1   Jun. 9, 2011

(51) Int. Cl.
*H04L 12/28* (2006.01)
*H04W 24/00* (2009.01)

(52) U.S. Cl.
USPC ........................................ 370/254; 455/456.1

(58) Field of Classification Search
USPC ...... 370/254; 709/224; 455/456.1; 340/573.4
See application file for complete search history.

(56) References Cited

U.S. PATENT DOCUMENTS

| | | | |
|---|---|---|---|
| 6,885,969 B2* | 4/2005 | Sahinoglu | 702/150 |
| 7,324,824 B2* | 1/2008 | Smith et al. | 455/456.1 |
| 7,639,179 B2* | 12/2009 | Hansen et al. | 342/357.42 |
| 7,835,349 B2* | 11/2010 | Kota et al. | 370/386 |
| 7,852,267 B2* | 12/2010 | Duffett-Smith et al. | 342/463 |
| 8,099,109 B2* | 1/2012 | Altman et al. | 455/456.3 |
| 8,130,146 B2* | 3/2012 | Belcea et al. | 342/387 |
| 8,219,114 B2* | 7/2012 | Larsen | 455/456.1 |
| 2004/0046667 A1* | 3/2004 | Copley | 340/573.4 |
| 2004/0185873 A1* | 9/2004 | Gilkes et al. | 455/456.2 |
| 2005/0049821 A1* | 3/2005 | Sahinoglu | 702/150 |
| 2007/0010248 A1* | 1/2007 | Dravida et al. | 455/435.1 |
| 2007/0066231 A1* | 3/2007 | Duffett-Smith et al. | 455/67.11 |
| 2007/0171873 A1* | 7/2007 | Nam et al. | 370/331 |
| 2007/0184851 A1* | 8/2007 | Barnwell et al. | 455/456.1 |
| 2008/0133336 A1* | 6/2008 | Altman et al. | 705/10 |
| 2009/0011713 A1* | 1/2009 | Abusubaih et al. | 455/67.11 |
| 2009/0247285 A1* | 10/2009 | Gagner | 463/25 |
| 2010/0026576 A1* | 2/2010 | Belcea et al. | 342/387 |
| 2010/0157848 A1* | 6/2010 | Das et al. | 370/254 |
| 2010/0309051 A1* | 12/2010 | Moshfeghi | 342/378 |

(Continued)

FOREIGN PATENT DOCUMENTS

| EP | 0242983 A2 | 10/1987 |
|---|---|---|
| GB | 1403879 | 8/1975 |
| WO | WO-2011068860 A1 | 6/2011 |

OTHER PUBLICATIONS

"International Application No. PCT/US2010/058545, International Search Report and Written Opinion mailed Mar. 22, 2011", 12 pgs.

(Continued)

*Primary Examiner* — Firmin Backer
*Assistant Examiner* — Michael A Chambers
(74) *Attorney, Agent, or Firm* — Fogg & Powers LLC

(57) ABSTRACT

The physical position of a movable node in a network is determined by sending a broadcast message from the movable node repeated through a path comprising at least a first node, a second node, and a third node, wherein the first, second, and third nodes have known locations. The movable node receives the broadcast message from the first, second, and third nodes, and measures the time from sending the repeated broadcast message to the time the broadcast message is received from each of the first, second, and third nodes. The movable node determines the distance from the movable node to the first, second, and third network nodes by using at least a known turnaround time and known message propagation velocity, such that the position of the movable node is determined.

18 Claims, 3 Drawing Sheets

U.S. PATENT DOCUMENTS

| | | | |
|---|---|---|---|
| 2010/0324821 A1* | 12/2010 | Etchegoyen | 701/216 |
| 2011/0028161 A1* | 2/2011 | Larsen | 455/456.1 |
| 2011/0086646 A1* | 4/2011 | Gupta et al. | 455/456.1 |
| 2011/0130197 A1* | 6/2011 | Bytnar et al. | 463/25 |
| 2012/0169533 A1* | 7/2012 | Harper et al. | 342/357.29 |
| 2012/0179811 A1* | 7/2012 | Eicken et al. | 709/224 |

OTHER PUBLICATIONS

"International Application Serial No. PCT/US2010/058545, Written Opinion mailed Dec. 12, 2011", 4 pgs.

* cited by examiner $$t_1 = t_{(M_1, F_1)} 2 + t_{(TURN)}$$

$$t_2 = 2t_{(TURN)} + t_{(M_1, F_1)} + t_{(F_1, F_2)} + t_{(F_2, M_1)}$$

$$t_3 = 3t_{(TURN)} + t_{(M_1, F_1)} + t_{(F_1, F_2)} + t_{(F_2, F_3)} + t_{(F_3, M_1)}$$

Fig. 3

LOCATION OF MOBILE NETWORK NODES

FIELD OF THE INVENTION

The invention relates generally to mesh networks, and more specifically in one embodiment to locating mobile network nodes.

BACKGROUND

Although computer networks have become relatively common both in office and in home networking environments, such networks are typically fairly sophisticated and require significant processing power, electrical power, and infrastructure to work well. Other networks, such as wireless Wi-Fi computer networks and cellular telephone networks use access controls, encryption, multiple bands or channels, and other methods to ensure secure and reliable wireless communication. Other networking applications do not require so robust a network environment, but can benefit from the ability to provide electronic communications between devices.

One such example is the Bluetooth technology that enables a cell phone user to associate and use an earpiece in what is sometimes referred to a personal area network or PAN. Another example is a mesh network, in which a number of devices work together to form a mesh, such that data can be sent from a source device to a destination device via other devices in the mesh network.

Mesh networks often include multiple links from a network node to other network nodes nearby, and can thereby provide routing around broken links or paths by discovering other routes through the mesh to a destination node. New nodes to a mesh network are typically able to automatically discover the mesh network when they are activated in the vicinity of a compatible mesh network, and can easily join the network.

Mesh networks are typically made up of network nodes that are not mobile, and so link quality and reliability is relatively slow to change. Most applications of mesh networks rely on radio frequency communications to transfer data between network nodes, as running cables between nodes defeats somewhat the intended ease of installation and use of mesh network devices.

Mesh network device installations often have multiple networks deployed in remote locations, and are managed from a central location or server. The central location computer might have knowledge of what devices are within each of the mesh networks under management, but typically does not have direct access to the network nodes or knowledge of the location of each node in the network. For example, a mesh network controller might monitor an array of temperature and humidity sensors in a warehouse and know the location of some fixed nodes in the warehouse, but will not know the location of other, mobile nodes in the network.

There exists a need to provide network technology that addresses factors such as management of wireless mesh network nodes.

SUMMARY

One example embodiment of the invention comprises determining the physical position of a movable node in a network by sending a broadcast message from the movable node repeated through a path comprising at least a first node, a second node, and a third node, wherein the first, second, and third nodes have known locations. The movable node receives the broadcast message from the first, second, and third nodes, and measures the time from sending the repeated broadcast message to the time the broadcast message is received from each of the first, second, and third nodes. The movable node determines the distance from the movable node to the first, second, and third network nodes by using at least a known turnaround time and known message propagation velocity, such that the position of the movable node is determined.

BRIEF DESCRIPTION OF THE FIGURES

FIG. 3 illustrates time equations illustrating the time of travel of various messages received in a movable node to determine the movable node's location, consistent with an example embodiment of the invention.

DETAILED DESCRIPTION

Figure 1:
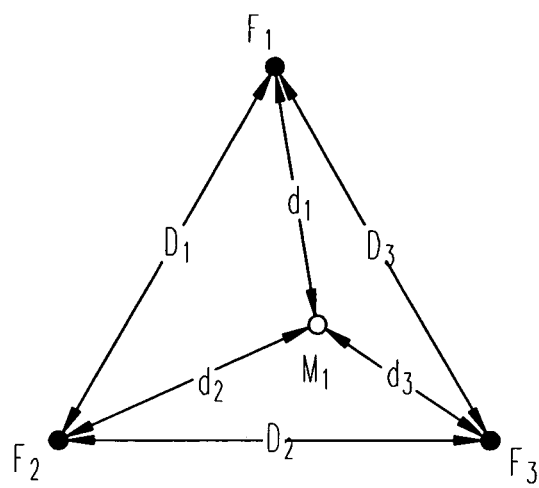
FIG. 1 shows an example radio frequency mesh network comprising three fixed nodes and a movable node, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Many wireless networks such as mesh networks are often used to route data between various elements or nodes in a network made up of a number of loosely assembled nodes. Mesh networks are designed such that a compatible node can easily join the network and receive and send data, including passing received data long a route to an intended destination node. Mesh networks are therefore considered self-arranging and self-healing, in that if a node becomes inoperable or loses a connection to another node, data can be easily routed around the broken network link.

Many mesh network technologies use wireless communication, further enhancing the ease of use of mesh networking for certain applications. Because deployed mesh network nodes are typically stationary for some period of time, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network or other type of network.

One example of a mesh network standard using wireless radio communication is the ZigBee mesh network, which was developed by an industry alliance and is related to IEEE standards including 802.15.4. The retail price of ZigBeecompliant transceivers is nearly a dollar, and a transceiver, memory, and processor can be bought for a few dollars in quantity, making integration of mesh network technology into inexpensive electronic devices a practical option. The standard is intended to support low power consumption at reasonably low data rates, and provides a self-organizing network technology that works well for applications such as control, monitoring, sensing, and home automation.

In this example of wireless mesh technology, one node operates as a coordinator, forming the root of the mesh network and performing other functions such as bridging to other networks and handling encryption keys. Most nodes are router nodes, which can receive and send data, including passing data along to other nodes. In some embodiments, end device nodes contain just enough functionality to receive and send data, but cannot route or pass data from a sending node to a different receiving node. While this preserves battery life and reduces the cost of the node, end device nodes are unable to contribute to the routing functions of the mesh network, and so will typically not make up a large percentage of a mesh network's nodes.

Although various nodes in the mesh network can communicate with other nodes using the node ID of the destination node, they do so in a different way than TCP/IP or many other network types. Each node in a ZigBee network sends a regular link status message, enabling its neighbor nodes to record the neighboring node as a neighbor, along with other information such as the link quality or signal strength. The paths within the network are managed within the individual router nodes that make up the bulk of the network, which maintain routing information regarding their links directly to other nodes but do not contain full routing capability. For example, a ZigBee node may know that to forward a message to node 134 it should send the message to its neighboring node 37, but it does not know the route the message takes from node 37 to 134.

ZigBee primarily uses technology known as Ad-hoc On-demand Distance Vector (AODV) to automatically construct an ad-hoc network by use of a route discovery process. An originating node broadcasts a route request command, which keeps track of its source, and other characteristics such as the number of nodes traversed and link quality between nodes as it progresses through the network. The destination node receives one or more copies of the broadcast request, and sends back a reply indicating which of the one or more routes discovered to use based on factors such as the number of hops and link quality between nodes. Each of the intermediate nodes maintains a list of immediate neighbor nodes to use for various destination nodes, but does not maintain a complete route.

ZigBee also includes many-to-one routing and source routing in some embodiments (e.g. ZigBee PRO) in which aggregator nodes are used to collect regular messages from multiple other nodes, such as where an aggregator is a gateway node in a sensor network. Source routing allows the aggregator to store complete routes to several other nodes in the network, where the route is determined by an aggregator node broadcast message and reply process. Sending a message to an aggregator using such a stored broadcast message path rather than route discovery is often known as "many-to-one" routing.

Because ZigBee nodes are not given traditional network addresses such as in a TCP/IP network, and routing within the ZigBee network is different than in an IP network, it is difficult for an outside network such as a TCP/IP, SMS, or other network to directly communicate with a specific node in a mesh network. Although adding a new node to such a network and routing to the new node is relatively straightforward, as explained above, identification of the node's position relative to other fixed nodes is somewhat more difficult.

Only the new node knows who all of its neighbors are and their relative signal strengths, enabling a crude approximation of position. But, signals can be attenuated or amplified by presence of metal objects in the area, such as in a warehouse environment, making such position determinations suspect. Because mesh networks are often used in sensing or monitoring applications where the physical location of a node is important, it is desirable to be able to determine the physical position of a new or mobile node in such a wireless network environment.

Some solutions to network node position determination include using GPS (Global Positioning System) receivers in the nodes, such that the GPS receiver can provide the node with its location. This significantly raises the cost and complexity of the node, as a GPS receiver must then be added to each such node. Other systems use a common timebase and methods of triangulation or trilateration, but require a significant number of messages be passed from the mobile node to determine time of flight to at least three other nodes with known positions.

One example embodiment of the invention therefore provides a system and method for using a single broadcast timing message from the mobile node to determine the position of the node using other nodes having known positions.

One such example is illustrated in FIG. 1, which illustrates a mobile node M1 having an unknown position, and three fixed nodes F1, F2, and F3 having known positions. Because the positions of the three fixed nodes are known, the distances between them represented by D1, D2, and D3 are also known. The distances to the mobile node of unknown position are not yet known, however, and are represented by d1, d2, and d3. Determination of these distances between the mobile node the fixed nodes will enable determination of the position of the mobile node M1.

Figure 2:
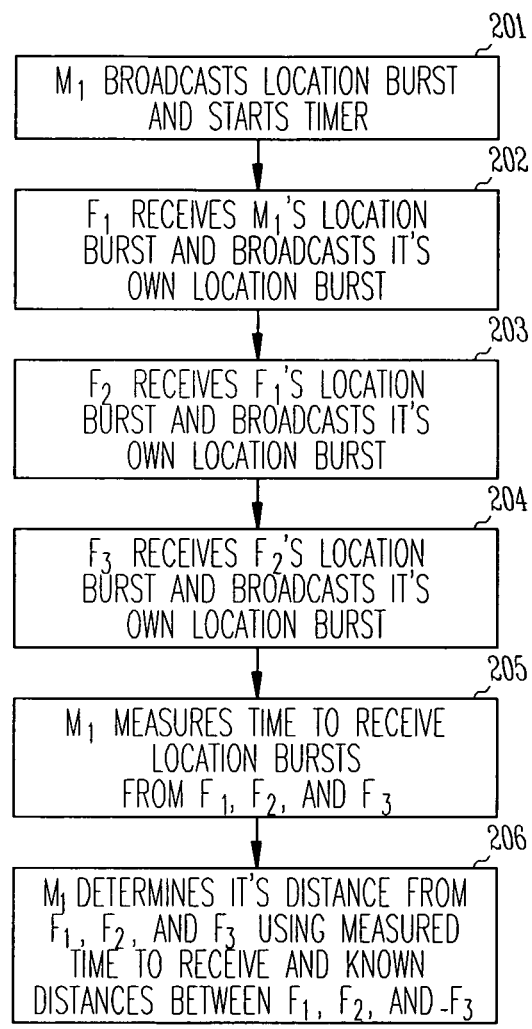
FIG. 2 is a flowchart of a method of determining the position of a movable node in a wireless network environment, consistent with an example embodiment of the invention.

One example method of determining the distance between M1 and the fixed nodes, and thereby the location of M1, is illustrated in the flowchart of FIG. 2. First, the M1 node broadcasts a location burst signal and starts a timer, as shown at 201. This burst signal is received by all nodes, and in a further embodiment each node receiving the burst location signal starts a timer upon receipt of the signal.

At least one of the fixed nodes, denoted F1 in FIG. 1, receives the location burst and broadcasts its own location burst in response, as shown at 202. Another fixed node denoted F2 receives this location burst from F1, and broadcasts its own location burst at 203. Similarly, fixed node F3 receives F2's location burst signal and broadcasts its own location burst in response at 204.

The mobile node M1 uses its timer to record not only the time of its initial broadcast at 201, but also the times of receipt of the other location bursts from F1, F2, and F3. Because the mobile node M1 knows the turnaround time it takes each node to receive and resend a location burst signal, and knows the path the location burst signal took between the fixed nodes F1, F2, and F3 having known locations, the mobile node M1 can compute its position based on the timing of receipt of the respective location burst signals.

In a more detailed example, the node M1 broadcasts a location burst signal at a start time, t0. The first fixed node F1 receives the location burst signal, and after a known turnaround time broadcasts its own location burst signal. This responsive location burst signal is received in the mobile node M1, and the time of receipt is recorded. The mobile node knows that the time that has elapsed since sending its own location burst signal is the time of flight of the signal times two, plus the turnaround time in the fixed node F1.

This enables straightforward determination of the time of flight for the RF signal to travel the distance d1 as shown in FIG. 1, enabling straightforward calculation of the distance d1 given that the propagation velocity of an RF signal is well known.

FIG. 3 shows formulas indicating the time taken for a location burst signal from each of the fixed nodes F1, F2, and F3 to reach the mobile node M1, consistent with an example embodiment of the invention. As shown in the formula T1, the time for receipt of a location burst message from F1 is the time of flight from node M1 to F1, the turnaround time T(turn), and the time of flight back from node F1 to M1. The time of flight between F1 and M1 can easily be determined once time T1 is recorded, enabling calculation of the distance between node F1 and M1 using the propagation speed of the signal.

Similarly, the time taken for node M1 to receive the location burst signal from node F2 is expressed as T2 in FIG. 3. Here, the time between M1 broadcasting its location burst and receiving a location burst signal from F2 is described as the time of flight between M1 and F1, expressed in terms of the known quantities T1 and T(turn), plus the turnaround time in nodes F1 and F2, plus the time of flight between nodes F1 and F2, plus the time of flight between nodes F2 and M1. As the time of flight between nodes F1 and F2 is known based on their known physical location, the turnaround time is known, and the times T1 and G2 have been recorded, the only unknown variable is the time of flight between F2 and M1. This can be solved for using the T2 equation, and the known speed of signal propagation is used to determine the distance between fixed node F2 and mobile node M1, shown as d2 in FIG. 1.

This process is repeated for at least one additional node F3, such that when fixed node F3 receives the location burst signal from F2 it broadcasts its own location burst signal after a known turnaround time. The time it takes this location burst signal to reach the mobile node M1 is given by the equation for time T3 in FIG. 3. More specifically, the time from M1 broadcasting its location burst to the time it receives fixed node F3's location burst is equal to the time of flight from M1 to F1, plus the turnaround time in each of the three fixed nodes F1, F2, and F3, plus the time of flight from F1 to F2, plus the time of flight from F2 to F3, plus the time of flight from F3 to M1. All of these parameters are known except for the time of flight from F3 to M1, which can be calculated using the equation given.

Knowing the time of flight from F3 to M1 and the velocity of propagation of the signal, the distance d3 between F3 and M1 can be determined. Now that the distances d1, d2, and d3 as shown in FIG. 1 have been determined, the location of node M0 is known.

In a further embodiment, another node M2 can determine its location by observing the time it takes between location burst signals from fixed nodes F1, F2, and F3 to be received in the node M2, and by determining the distance from M2 to at least one node such as F1 by sending a location burst signal to F1 and timing the reply message, thereby determining the distance from F1 to M2.

The approach described herein has a variety of advantages over systems currently in use, including not needing complicated and expensive Global Positioning System hardware or carefully synchronized clocks distributed between nodes. Although the example above is presented in the context of a ZigBee mesh network, other mesh networks such as DigiMesh and non-mesh networks such as Wi-Fi and wireless cellular networks can also use the methods described herein to determine the position of a mobile node in the network using three or more other nodes having known locations.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A method of determining the physical position of a movable node in a network, comprising:
    sending a first message from the movable node to at least a first node;
    receiving the first message in the first node and sending a second message from the first node in reply;
    receiving the second message in the movable node and determining in the movable node the distance between the movable node and the first node using the time between sending the first message and receiving the second message;
    receiving the second message in a second node and sending a third message from the second node in reply;
    receiving the third message in the movable node and determining in the movable node the distance between the movable node and the second node using the time between sending the first message and receiving the third message;
    receiving the third message in a third node and sending a fourth message from the third node in reply;
    receiving the fourth message in the movable node and determining in the movable node the distance between the movable node and the third node using the time between sending the first message and receiving the fourth message;
    determining the location of the moveable node from the determined distances between the first moveable node and known locations of the first, second and third nodes.

2. The method of claim 1, further comprising compensating for the turnaround time taken to reply to a received message in at least one of the first, second, and third nodes.

3. The method of claim 1, further comprising using known velocity of propagation of the messages to determine distance between nodes from message times.

4. The method of claim 1, wherein the nodes comprise mesh network nodes.

5. The method of claim 1, wherein the network nodes comprise at least one of a Zigbee, a DigiMesh, a Wi-Fi, and a cellular telephone network.

6. The method of claim 1, wherein one or more of the first, second, and third nodes comprise a movable node whose location has already been determined.

7. A moveable wireless network node operable to determine its physical location by:
    sending a first message from the movable node to at least a first node;
    receiving the first message in the first node and sending a second message from the first node in reply;
    receiving the second message in the movable node and determining in the movable node the distance between the movable node and the first node using the time between sending the first message and receiving the second message;
    receiving the second message in a second node and sending a third message from the second node in reply;

receiving the third message in the movable node and determining in the movable node the distance between the movable node and the second node using the time between sending the first message and receiving the third message;

receiving the third message in a third node and sending a fourth message from the third node in reply;

receiving the fourth message in the movable node and determining in the movable node the distance between the movable node and the third node using the time between sending the first message and receiving the fourth message;

determining the location of the moveable node from the determined distances between the first moveable node and known locations of the first, second and third nodes.

8. The moveable wireless network node of claim 7, the moveable node further operable to compensate for the turnaround time taken to reply to a received message in at least one of the first, second, and third nodes.

9. The moveable wireless network node of claim 7, the moveable node further operable to use known velocity of propagation of the messages to determine distance between nodes from message times.

10. The moveable wireless network node of claim 7, wherein the nodes comprise mesh network nodes.

11. The moveable wireless network node of claim 7, wherein the network nodes comprise at least one of a Zigbee, a DigiMesh, a Wi-Fi, and a cellular telephone network.

12. A machine-readable device with instructions stored thereon, the instructions when executed operable to cause a computerized movable wireless network node to:

send a first message from the movable node to at least a first node;

receive the first message in the first node and send a second message from the first node in reply;

receive the second message in the movable node and determine in the movable node the distance between the movable node and the first node using the time between sending the first message and receiving the second message;

receive the second message in a second node and send a third message from the second node in reply;

receiving the third message in the movable node and determine in the movable node the distance between the movable node and the second node using the time between sending the first message and receiving the third message;

receive the third message in a third node and send a fourth message from the third node in reply;

receive the fourth message in the movable node and determine in the movable node the distance between the movable node and the third node using the time between sending the first message and receiving the fourth message; and determine the location of the moveable node from the determined distances between the first moveable node and known locations of the first, second and third nodes.

13. The machine-readable device of claim 12, the instructions when executed in the moveable node further operable to compensate for the turnaround time taken to reply to a received message in at least one of the first, second, and third nodes.

14. The machine-readable device of claim 12, the instructions when executed in the moveable node further operable to use known velocity of propagation of the messages to determine distance between nodes from message times.

15. The machine-readable device of claim 12, wherein the network nodes comprise mesh network nodes.

16. The machine-readable device of claim 12, wherein the network nodes comprise at least one of a Zigbee, a DigiMesh, a Wi-Fi, and a cellular telephone network.

17. A method of determining the physical position of a movable node in a network, comprising:

sending a broadcast message from the movable node repeated through a path comprising at least a first node, a second node, and a third node, wherein the first, second, and third nodes have known locations;

receiving the broadcast message from the first, second, and third nodes, and measuring the time from sending the repeated broadcast message to the time the broadcast message is received from each of the first, second, and third nodes;

determining the distance from the movable node to the first, second, and third network nodes by using at least a known turnaround time and known message propagation velocity, such that the position of the movable node is determined.

18. A movable wireless network node operable to determine its physical location by:

sending a broadcast message from the movable node repeated through a path comprising at least a first node, a second node, and a third node, wherein the first, second, and third nodes have known locations;

receiving the broadcast message from the first, second, and third nodes, and measuring the time from sending the repeated broadcast message to the time the broadcast message is received from each of the first, second, and third nodes;

determining the distance from the movable node to the first, second, and third network nodes by using at least a known turnaround time and known message propagation velocity, such that the position of the movable node is determined.

* * * * *